United States Patent Office 3,598,701
Patented Aug. 10, 1971

3,598,701
PROCESS FOR PRODUCING L-HOMOSERINE
Katsunobu Tanaka, Machida-shi, Kazuo Ohshima, Tokyo, and Yoh Tokoro and Mitsuyoshi Okii, Machida-shi, Japan, assignors to Kyowa Hakko Kogyo Co., Ltd., Tokyo, Japan
No Drawing. Filed Aug. 28, 1968, Ser. No. 755,802
Claims priority, application Japan, Sept. 12, 1967, 42/58,130
Int. Cl. C12b 1/00
U.S. Cl. 195—28                            9 Claims

ABSTRACT OF THE DISCLOSURE

A process for producing L-homoserine and L-lysine in substantial amounts by fermentation which comprises culturing L-threonine-requiring microorganisms in media containing suitable amounts of hydrocarbons, nitrogen sources, inorganic compounds and other nutrients necessary for the growth of the microorganisms. Exemplary strains employed include those belonging to the genera Corynebacterium.

This invention relates to a process for producing L-homoserine. More particularly, it relates to a process for the production of L-homoserine by fermentation. Even more particularly, the invention relates to a process for the production of L-homoserine by fermentation by culturing L-threonine-requiring microorganisms in media containing suitable amounts of hydrocarbons, nitrogen sources, inorganics and the like.

It is well known that L-homoserine is an important metabolic intermediate in processes for the biosynthesis of the essential amino acids, L-threonine and L-methionine, and that it exists in nature in slight amounts in certain kinds of plants. As to the production of L-homoserine by means of microorganisms, reports have appeared in the literature that methionine-requiring strains of *Neurospora crassa* accumulate slight amounts of L-homoserine in the microbial cells thereof [Journal of Biological Chemistry, vol. 190, p. 277 (1951)] and that L-threonine-requiring strains of *Micrococcus glutamicus* accumulate substantial amounts of L-homoserine and L-lysine in culture liquors [Amino Acid, vol. 2, p. 125 (1960)]. However, saccharides are used as starting materials in these processes.

With the aim of producing amino acids by the use of hydrocarbons as starting materials, the present inventors have derived nutrient-requiring mutants from many hydrocarbon-assimilating microorganisms and have examined the production of amino acids by the use of these mutants. As a result, the inventors have found that nutrient-requiring mutants, which require L-threonine for the growth thereof, produce and accumulate substantial amounts of L-homoserine in the culture media.

Accordingly, one of the objects of the present invention is to provide an improved process for the production of the amino acid, L-homoserine, which overcomes the disadvantages and deficiencies of the prior art methods.

Another object of the present invention is to provide a process for producing L-homoserine by fermentation which may be carried out in an efficacious and simple manner.

A further object of the invention is to provide a process for producing L-homoserine by fermentation which may be carried out advantageously and economically on an industrial scale to give a high yield of product.

A still further object of the invention is to provide L-homoserine.

These and other objects and advantages of the present invention will become apparent to those skilled in the art from a consideration of the following specification and claims.

In accordance with the present invention, it has been found that substantial amounts of L-homoserine are produced by culturing L-threonine-requiring microorganisms in media containing hydrocarbons as the main source of carbon. Preferred strains to be employed for the fermentation process in accordance with the present invention are L-threonine-requiring strains obtained by the ultraviolet irradiation of hydrocarbon-assimilating microorganisms previously found by the present inventors.

One of the preferred mutant strains obtained is *Corynebacterium hydrocarboclastus* 2438-u-34 ATCC 21267. The parent strain is *Corynebacterium hydrocarboclastus* ATCC 15592.

Either a synthetic culture medium or a natural nutrient medium is suitable in the present invention as long as it contains the essential nutrients for the growth of the particular strains employed and, in accordance with the present invention, contains a hydrocarbon as the main carbon source therein. Such nutrients are well known in the art and include substances such as a carbon source, a nitrogen source, inorganic compounds and the like which are utilized by the microorganism employed in appropriate amounts. As noted above, the fermentation in connection with the present invention is conducted in an aqueous medium containing a hydrocarbon or a mixture of hydrocarbons as the main carbon source. Such hydrocarbons include straight and branched-chain paraffins (alkanes) having from 10 to 45 carbon atoms, such as n-decane, n-dodecane, n-hexadecane, etc., gaseous hydrocarbons such as methane, ethane, propane, butane, etc., and crude hydrocarbon materials such as kerosene, light oils, heavy oils, paraffin oils, etc. The use of n-paraffins having from 11 to 18 carbon atoms is preferred since these hydrocarbons give high yields of L-homoserine and L-lysine. Small amounts of other carbon sources such as carbohydrates, for example, glucose, fructose, maltose, sucrose, starch, starch hydrolysate, molasses etc., or any other suitable carbon source such as glycerol, mannitol, sorbitol, organic acids, etc. may be used in the fermentation medium along with the hydrocarbon. These substances may be used either singly or in mixtures of two or more.

As a nitrogen source, various kinds of inorganic or organic salts or compounds, such as urea or ammonium salts such as ammonium chloride, ammonium sulfate, ammonium nitrate, ammonium phosphate, ammonium carbonate, etc., or natural substances containing nitrogen, such as corn steep liquor, yeast extract, meat extract, fish meal, peptone, bouillon, casein hydrolysates, fish solubles, rice bran extract, soybean meal hydrolysate, etc. may be employed. These substances may also be used either singly or in combinations of two or more.

Inorganic compounds which may be added to the culture medium include, for example, magnesium sulfate, sodium phosphate, potassium dihydrogen phosphate, potassium monohydrogen phosphate, iron sulfate or other iron salts, manganese chloride, calcium chloride, etc.

Growth-promoting agents may also be desirable and may be added to the medium in suitable amounts. Exemplary thereof are vitamins, such as biotin, thiamine, cobalamin and the like.

In the case of using a pure synthetic medium, a single organic compound such as thiamine or L-threonine should be added in amounts necessary for the growth of the microorganism employed, whereby it becomes possible to accumulate L-homoserine and L-lysine in substantially the same amounts as in the case where the aforesaid natural organic nitrogen sources have been used.

The fermentation is conducted under aerobic conditions, such as aerobic shaking of the culture or with stirring of a submerged and aerated culture, at a temperature of, for example, about 25° to 50° C., preferably 28°–37° C. During the cultivation, the pH of the culture liquor is desirably maintained at approximately a neutral pH (around 7.0). For this purpose, ammonia, sodium hydroxide or ammonium carbonate is advantageously employed as a neutralizing agent. Generally, the cultivation is effected for from two to four days, whereby substantial amounts of L-homoserine and L-lysine are found to be accumulated in the culture liquor.

After the completion of fermentation, the culture liquor is freed from microbial cells and is then subjected to a conventional treatment in order to separate the desired products. Accordingly, the L-homoserine and L-lysine may be recovered by ion exchange resin treatment, precipitation with metallic salts, adsorption chromatography or the like. Example 1 hereinbelow shows a typical ion exchange resin treatment for the recovery of L-homoserine and L-lysine.

The following examples are given merely as illustrative of the present invention and are not to be considered as limiting.

EXAMPLE 1

*Corynebacterium hydrocarboclastus* 2438-u-34 ATCC 21267 (a threonine-required strain) is used as the seed strain after having been cultured on a bouillon-agar slant at 28° C. for 24 hours. The strain is subjected to culturing with aerobic shaking in a yeast-bouillon medium for 24 hours in order to obtain a seed culture.

A fermentation medium having the following composition is prepared:

0.2% $KH_2PO_4$
0.1% $MgSO_4 \cdot 7H_2O$
0.001% $FeSO_4 \cdot 7H_2O$
1% $NH_4NO_3$
0.5% NZ-Amine (a series of casein hydrolysates)
0.2% $Na_2HPO_4$
0.005% $MnSO_4 \cdot 4H_2O$
0.001% $ZnSO_4 \cdot 7H_2O$
1 mg./l. thiamine
5% $C_{12}$–$C_{14}$ n-paraffin mixture The pH of this medium is 7.0.

After sterilizing the above fermentation medium, 2% of calcium carbonate, which has been separately sterilized with dry heat, is added thereto. Then, 5% of a yeast-bouillon culture liquor of the above-mentioned seed strain is inoculated in the medium. Culturing is carried out with aerobic shaking of the culture at 30° C. for four days. The pH of the culture liquor during the cultivation is maintained at substantially neutral by means of ammonia water.

The results of the cultivation are as follows:

| Cultivation (days) | pH | mg./ml. Amount of L-homoserine produced | Amount of L-lysine produced |
|---|---|---|---|
| 2 | 6.8 | 4.7 | 2.4 |
| 4 | 7.2 | 6.2 | 3.0 |

After completion of the cultivation, the microbial cells are removed by filtration. One liter of the filtrate is passed through a resin column containing Diaion SK #1 (manufactured by Mitsubishi Kasei Co., Ltd.), a strongly acidic sulfonic acid type cation exchange resin which has been brought into the ammonia form by washing with 2 N ammonia water, whereby L-lysine is adsorbed on the resin. The L-homoserine passes through the column without being substantially adsorbed. The liquid which has passed through the column is adjusted to a pH of 2.2 with concentrated hydrochloric acid and is again passed through a resin column containing Diaion SK #1, a strongly acidic cation exchange resin, which has been brought into the H form, in order to adsorb L-homoserine on the resin. The two resin columns are washed with water and are then subjected to elution with 2 N ammonia water. Subsequently, ninhydrin reaction-positive fractions are collected and are concentrated at below 40° C. under reduced pressure. The concentrate, after being subjected to decoloration with bone black, is charged with alcohol (ethanol), whereby 2.4 g. of crude crystals of L-lysine and 5.2 g. of crude crystals of L-homoserine are obtained.

EXAMPLE 2

The cultivation described in Example 1 is repeated, except that 0.5% of yeast extract is used in place of the 0.5% NZ-Amine employed in the fermentation medium of Example 1. As a result, 6.5 mg./ml. of L-homoserine and 3.2 mg./ml. of L-lysine are obtained.

EXAMPLE 3

The cultivation of Example 1 is again repeated, except that 5% of kerosene is used in place of the 5% n-paraffin mixture employed in Example 1. As a result, 3.7 mg./ml. of L-homoserine and 1.7 mg./ml. of L-lysine are obtained.

EXAMPLE 4

The cultivation described in Example 1 is repeated, except that the fermentation medium employed is composed of the following ingredients:

0.2% $KH_2PO_4$
0.2% $Na_2HPO_4$
0.1% $MgSO_4 \cdot 7H_2O$
0.005% $MnSO_4 \cdot 4H_2O$
0.001% $FeSO_4 \cdot 7H_2O$
0.001% $ZnSO_4 \cdot 7H_2O$
1% $NH_4NO_3$
1 mg./l. thiamine
400 mg./l. L-threonine
5% $C_{11}$–$C_{14}$ n-paraffin mixture The pH of this medium is 7.0.

As a result of the fermentation, 7.4 mg./ml. of L-homoserine and 3.5 mg./ml. of L-lysine are obtained.

The invention being thus described, it will be obvious that the same may be varied in many ways. Such variations are not to be regarded as a departure from the spirit and scope of the invention, and all such modifications are intended to be included within the scope of the following claims.

We claim:
1. A process for producing L-homoserine which comprises culturing the microorganism *Corynebacterium hydrocarboclastus* ATCC 21267 under aerobic conditions in an aqueous nutrient medium containing at least one hydrocarbon as the main source of carbon, accumulating

L-homoserine in the resultant culture liquor, and isolating said L-homoserine from the culture liquor.

2. The process of claim 1, wherein culturing is carried out at a temperature of about 25° to 50° C. and at a pH of about 7.

3. The process of claim 1, wherein said hydrocarbon is selected from the group consisting of aliphatic hydrocarbons having from 10 to 45 carbon atoms, gaseous hydrocarbons and crude petroleum hydrocarbon substances.

4. The process of claim 1, wherein said hydrocarbon is an n-paraffin of 11 to 18 carbon atoms.

5. The process of claim 1, wherein said hydrocarbon is kerosene.

6. The process of claim 2, wherein said hydrocarbon is an n-paraffin of 11 to 18 carbon atoms.

7. The process of claim 2, wherein said hydrocarbon is kerosene.

8. The process of claim 1, wherein said medium contains a sufficient amount of L-threonine for the growth of said microorganism.

9. The process of claim 1, wherein said L-homoserine s recovered by a cation exchange resin treatment.

References Cited

FOREIGN PATENTS 6612504   3/1967   Netherlands _____ 195—28

A. LOUIS MONACELL, Primary Examiner

G. M. NATH, Assistant Examiner